(No Model.) 2 Sheets—Sheet 1.

A. VAN BIBBER.
MITER TOOL.

No. 482,107. Patented Sept. 6, 1892.

Attest
B. F. Harper
L. M. Jones

Inventor
Andrew van Bibber,
by John E. Jones,
his Attorney (No Model.) 2 Sheets—Sheet 2.
A. VAN BIBBER.
MITER TOOL.
No. 482,107. Patented Sept. 6, 1892.
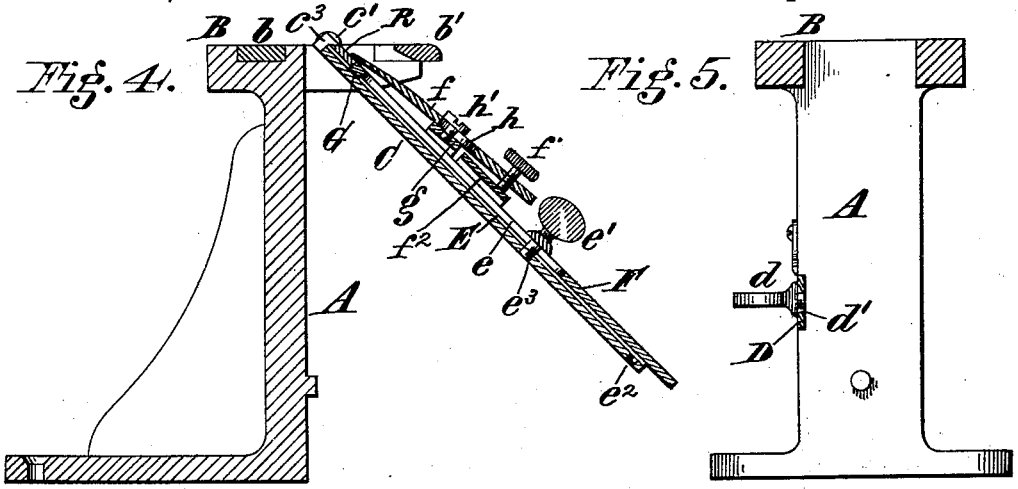
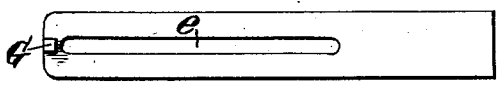
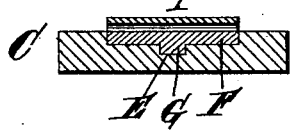
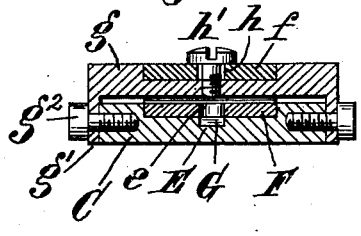
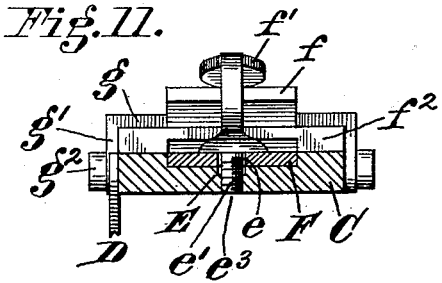
Attest
B. F. Harper
L. M. Jones
Inventor
Andrew Van Bibber,
by John E. Jones,
his Attorney.

UNITED STATES PATENT OFFICE.

ANDREW VAN BIBBER, OF CINCINNATI, OHIO.

MITER-TOOL.

SPECIFICATION forming part of Letters Patent No. 482,107, dated September 6, 1892.

Application filed April 4, 1892. Serial No. 427,680. (No model.)

*To all whom it may concern:*

Be it known that I, ANDREW VAN BIBBER, a citizen of the United States, residing at Cincinnati, in the county of Hamilton and State of Ohio, have invented certain new and useful Improvements in Miter-Tools, of which the following is a specification.

My invention relates to tools or machines for beveling or mitering and squaring the ends of printers' rules and other strips or bars of material, and more particularly to improvements in the miter-tool for which William H. F. Bloebaum was granted United States Letters Patent No. 473,689, dated April 26, 1892, and of which I am a duly-authorized licensee, all of which will be fully hereinafter described, and pointed out in the claims.

Figure 1:
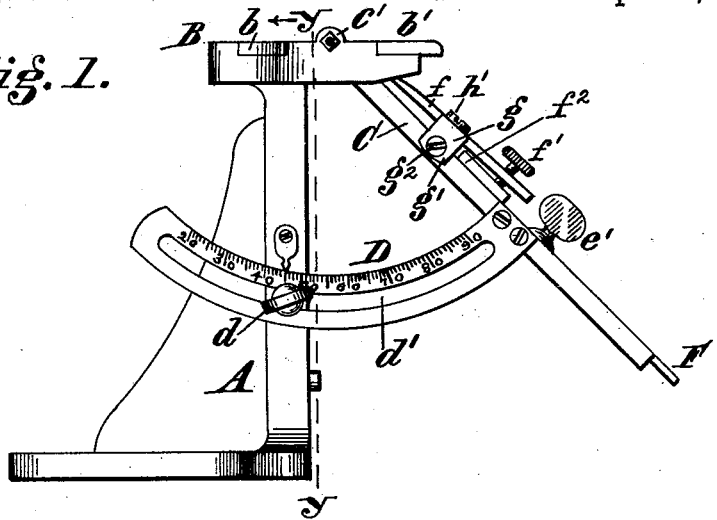
Figure 2:
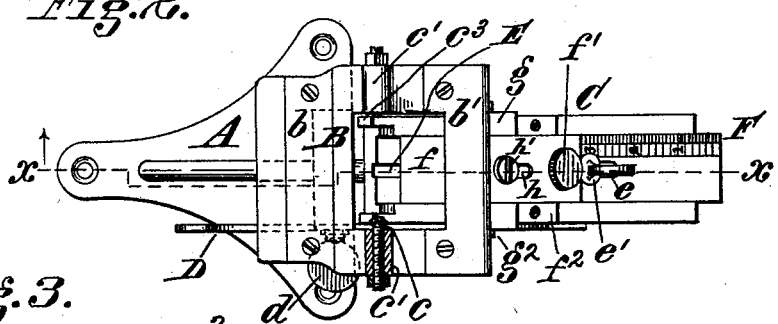
Figure 3:
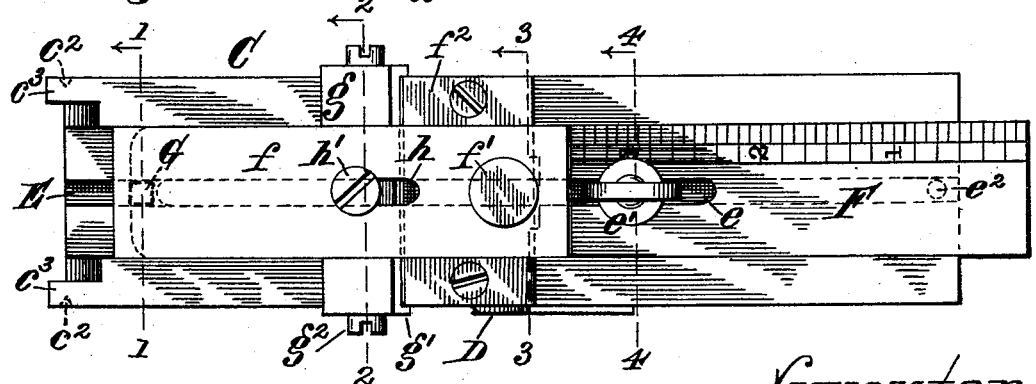

In the accompanying drawings, Figure 1 is a longitudinal side elevation of my invention, showing the tool arranged for a forty-five-degree cut; Fig. 2, a plan view, partly in section, to show the pivotal connection of the rule-holder with the table; Fig. 3, a full-size plan of the rule-holder detached from the main frame, the quadrant being shown broken off; Fig. 4, a longitudinal sectional elevation taken on the line $x\ x$ of Fig. 2, showing a small piece of metal or rule in the holder which has been operated upon by the workman; Fig. 5, a transverse sectional elevation on line $y\ y$, Fig. 1; Fig. 6, a bottom plan view of the sliding gage used in the rule-holder; Fig. 7, a plan view of the rule clamp-bar; Fig. 8, a transverse section of the rule-holder on line 1 1 of Fig. 3, showing my sliding gage, which forms the principal feature of my invention herein; Fig. 9, a transverse sectional elevation on line 2 2 of Fig. 3; Fig. 10, a similar view on line 3 3 of Fig. 3, and Fig. 11 a similar view on line 4 4 of Fig. 3.

I have shown in the drawings all the parts of the tool, which include most of those fully shown and described in said Bloebaum patent; but it will not be necessary for me to more than passingly refer to those of said patent and only sufficient to obtain a clear understanding of the objects, construction, and operation of what is now claimed as my invention and its particular application.

A represents the standard or main frame, having a horizontal orificed table B, the latter being provided with suitably-hardened steel anti-wearing plates $b\ b'$ at either side the orifice thereof, as clearly shown in Figs. 1, 2, and 4.

C represents a vertically-swinging rule-holder hinged or pivotally connected at its upper end in the orifice of the table and having its axis in the same plane as the top surface of said table.

$c\ c$ represent the pivotal points or bearings on which the rule-holder is swung or hinged. These points pass through lugs $c'\ c'$ on the table, their inner ends or points proper entering the table-orifice and engaging suitable sockets $c^2$ (shown in dotted lines, Fig. 3) in the upper projecting ends or lugs $c^3$ of the rule-holder.

D represents the graduated and numbered arc or sector, by which the rule-holder is set and held at the desired rule-dressing angle, the set-screw $d$, which passes through the slot $d'$ therein, and thence into the standard A, being provided to properly clamp and hold the rule-holder firmly in place. The face of the rule-holder is recessed the depth and width of the rule and an additional central groove or slot E is constructed therein the full length thereof, as most clearly shown in Figs. 3 and 4.

F represents the bar or gage for setting and adjusting the rule in the holder C. It is of the same length as said holder and of substantially the same depth and width as the main recess therein, and is also suitably graduated and numbered, as best seen in Figs. 2 and 3. I have shown it as being graduated to one-twelfth-inch divisions or spaces and numbered the full inches only, beginning with the figure "1" at the lower or outer end thereof; but it is obvious that it could be otherwise graduated and numbered to suit the work desired and not affect the principle of my invention in the least. This graduated and numbered gage being preferably the exact length of the holder proper, as before stated, its use in such form makes it especially desirable and convenient for the workman, who has but to slide or project its outer end at the same distance beyond the lower or outer end of the rule-holder as the full length of the rule shall be when mitered. Fig. 3 shows this feature exactly, the outer end of the gage projecting just one-half inch beyond the holder, leaving a space at the top for the rule-blank, which when filed or dressed at the desired angle will measure just one-half inch in length from the beveled or mitered edge to the rear or butt edge. Fig. 4 also shows this feature with a rule R in the said main recess in dressing position, but on a smaller scale.

I have found in practice that after a rule-blank has been beveled along one edge and reversing it in the holder, so that the other edge may also be beveled, it frequently happens that the sharply-mitered edge bearing against the upper end of the gage is forced under said end of the gage, and thereby materially affects the utility of the tool, and especially its accuracy, as rules would thus vary more or less in length, according to the distance they were forced under the gage by the pressure of the dressing-tool of the workman or otherwise. In order to obviate this difficulty and inaccuracy, I have constructed an inwardly-projecting lug G on the inner face of the extreme upper end of said gage. The outer face of said lug is constructed flush with the said end of the gage, so that the measurements and work will always be perfectly accurate, and said lug engages the central groove or slot E in the rule-holder, all as well shown in the combined Figs. 4, 6, and 8 and in dotted lines in Fig. 3. It will therefore be impossible for the sharp edge of a rule to become forced under the gage when this lug is present, and it positively obstructs any such entrance. The gage is provided with a longitudinal slot $e$ and thumb-screw $e'$, whereby it is adjustably and firmly held in the main recess of the holder, the said thumb-screw engaging threaded openings $e^2$ and $e^3$, respectively, in the holder-bed for greater or less lengths of rules to be mitered or otherwise dressed on their edges. The rule-blanks are each firmly held in place in the holder by means of a presser-clamp $f$, the latter being mounted on transverse bar $g$, which in turn straddles the stock of the holder and is pivotally connected therewith by means of lugs $g'$ and screws $g^2$, as best shown in Figs. 1, 3, 4, and 9. The fore end of the clamp $f$ is brought to bear on the face of the rule by means of the jack-screw $f'$, whose lower end bears on the transverse bar $f^2$, the latter being mounted on the rule-holder in the rear of rock-bar $g$, as best shown in Figs. 1, 3, 4, and 10. Clamp $f$ is provided with a slot $h$ and set-screw $h'$, the latter engaging said slot and the rock-bar $g$, as shown in Figs 3, 4, and 9, whereby it is longitudinally adjustable on said rock-bar, and thereby adapted to be brought forward with its fore end clear up to the fore end of the rule, if necessary, and making provision for rules of extremely short length.

I claim—

1. In a miter-tool, a suitable table, a rule-holder having a recessed base or stock and pivotally connected with said table, a longitudinally-adjustable bar or gage in said rule-holder, and a suitable clamp for holding the work to place, said gage having a series of graduations or lines on its face which are respectively brought to register with any desired mark or index on said holder-stock, whereby the space for the rule at the upper end of the holder, lying beyond the upper end of said gage, is readily determined and made to correspond with the length of the rule to be dressed, and said rule readily and accurately set in place for mitering or dressing, substantially as herein set forth.

2. In a miter-tool, the combination, with a rule-holder, of a longitudinally-adjustable and scaled or graduated gage and a suitable rule-holding clamp, the said gage being of the same length as the said rule-holder and its respective graduations brought to register with the lower end of the rule-holder, whereby its lower outwardly-projecting end is always identical with or the same in length as that of the vacant part or space above the gage at the upper end of the rule-holder and each rule readily and accurately set in position for mitering or other dressing, substantially as herein set forth.

3. In a miter-tool, the combination, with a grooved or slotted rule-holder, of a longitudinally-adjustable gage and a lug or projection constructed on its inner upper end and engaging the slot in said holder, whereby a guard is provided and the sharply-mitered edges of the respective rules are positively prevented from entering or being forced under said upper end of the gage, substantially as herein set forth.

4. In a miter-tool, the combination, with a grooved or slotted rule-holder, of a gage having its face scaled or graduated and at its upper end a lug or stop projecting inwardly from its bottom or inner face, substantially as and for the purpose specified.

In testimony of which invention I have hereunto set my hand.

ANDREW VAN BIBBER.

Witnesses:
 JOHN E. JONES,
 C. B. DONALDSON.